United States Patent
Byun et al.

(10) Patent No.: US 10,779,314 B2
(45) Date of Patent: Sep. 15, 2020

(54) METHOD AND APPARATUS FOR TRANSMITTING SCHEDULING REQUEST IN WIRELESS COMMUNICATION SYSTEM

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Jiwon Kang, Seoul (KR); Heejin Kim, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 16/096,254

(22) PCT Filed: May 16, 2017

(86) PCT No.: PCT/KR2017/005027
§ 371 (c)(1),
(2) Date: Oct. 24, 2018

(87) PCT Pub. No.: WO2017/209412
PCT Pub. Date: Dec. 7, 2017

(65) Prior Publication Data
US 2019/0166614 A1    May 30, 2019

Related U.S. Application Data

(60) Provisional application No. 62/344,979, filed on Jun. 2, 2016.

(51) Int. Cl.
*H04W 72/12* (2009.01)
*H04L 27/26* (2006.01)
(Continued)

(52) U.S. Cl.
CPC ....... *H04W 72/1284* (2013.01); *H04L 1/0003* (2013.01); *H04L 1/0013* (2013.01);
(Continued)

(58) Field of Classification Search
CPC ............. H04W 72/1284; H04W 28/02; H04W 72/1278; H04W 72/14; H04W 72/1252;
(Continued)

(56) References Cited

U.S. PATENT DOCUMENTS 8,761,077 B2 * 6/2014 Kim ...................... H04L 1/1854
370/315
2013/0163536 A1    6/2013 Anderson et al.
(Continued)

FOREIGN PATENT DOCUMENTS

WO    2015016625    2/2015

OTHER PUBLICATIONS

PCT International Application No. PCT/KR2017/005027, International Search Report dated Jul. 24, 2017, 4 pages.
(Continued)

*Primary Examiner* — Omar J Ghowrwal
(74) *Attorney, Agent, or Firm* — Lee, Hong, Degerman, Kang & Waimey

(57) ABSTRACT

Provided are a method and device for transmitting a scheduling request in a wireless communication system. In detail, a terminal receives, from a base station, resource allocation information for indicating a semi-persistent scheduling request and a scheduling request resource. The terminal receives, from the baste station, a first indicator for indicating whether the semi-persistent scheduling resource is activated and a second indicator for indicating whether the scheduling request resource is activated. The terminal determines whether the scheduling request can be transmitted on the basis of the first indicator and the second indicator. The
(Continued)

terminal transmits the scheduling request to the base station via the scheduling request resource indicated by the resource allocation information.

14 Claims, 14 Drawing Sheets

(51) Int. Cl.
| | |
|---|---|
| *H04L 5/00* | (2006.01) |
| *H04L 25/02* | (2006.01) |
| *H04W 28/02* | (2009.01) |
| *H04W 72/14* | (2009.01) |
| *H04W 72/04* | (2009.01) |
| *H04W 52/14* | (2009.01) |
| *H04L 1/00* | (2006.01) |
| *H04W 52/32* | (2009.01) |

(52) U.S. Cl.
CPC .......... *H04L 5/0053* (2013.01); *H04L 5/0064* (2013.01); *H04L 5/0082* (2013.01); *H04L 5/0094* (2013.01); *H04L 25/02* (2013.01); *H04L 27/26* (2013.01); *H04W 28/02* (2013.01); *H04W 28/0221* (2013.01); *H04W 28/0263* (2013.01); *H04W 28/0268* (2013.01); *H04W 28/0278* (2013.01); *H04W 52/146* (2013.01); *H04W 52/325* (2013.01); *H04W 72/042* (2013.01); *H04W 72/1242* (2013.01); *H04W 72/1252* (2013.01); *H04W 72/1278* (2013.01); *H04W 72/14* (2013.01); *H04L 1/0009* (2013.01); *H04L 5/0007* (2013.01); *H04L 5/0048* (2013.01); *H04L 25/0224* (2013.01)

(58) Field of Classification Search
CPC ........... H04W 72/1242; H04W 72/042; H04W 52/146; H04W 52/325; H04W 28/0263; H04W 28/0221; H04W 28/0268; H04W 28/0278; H04L 27/26; H04L 5/0082; H04L 5/0053; H04L 25/02; H04L 5/0094; H04L 5/0064; H04L 1/0013; H04L 1/0003; H04L 5/0048; H04L 5/0007; H04L 1/0009; H04L 25/0224
See application file for complete search history.

(56) References Cited

U.S. PATENT DOCUMENTS

2015/0334681 A1 11/2015 Wu
2019/0223202 A1* 7/2019 Byun ................ H04W 72/1284

OTHER PUBLICATIONS

Spreadtrum Communications, "Discussion on SR Enhancements for V2X", R1-164580, 3GPP TSG RAN WG1 Meeting #85, May 2016, 2 pages.
NEC, "Schedule Assignment for SPS", R1-164473, 3GPP TSG RAN WG1 Meeting #85, May 2016, 3 Pages.

* cited by examiner

METHOD AND APPARATUS FOR TRANSMITTING SCHEDULING REQUEST IN WIRELESS COMMUNICATION SYSTEM

CROSS-REFERENCE TO RELATED APPLICATIONS

This application is the National Stage filing under 35 U.S.C. 371 of International Application No. PCT/KR2017/005027, filed on May 16, 2017, which claims the benefit of U.S. Provisional Application No. 62/344,979, filed on Jun. 2, 2016, the contents of which are all hereby incorporated by reference herein in their entirety.

BACKGROUND OF THE INVENTION

Field of the Invention

This specification relates to wireless communication and, most particularly, to a method for transmitting a scheduling request in a wireless communication system and an apparatus using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a $3^{rd}$ generation partnership project (3GPP) long term evolution (LTE) system, a user equipment (UE) in an idle state must perform an RRC connection setup and a data connection setup before data transmission is performed. This means that both of a logical connection (RRC connection) between a base station (BS) and the UE and a logical connection (S1 connection/interface, EPS connection) between a mobility management entity (MME) and the UE are set up. Therefore, in order for the UE to perform data transmission, it takes an additional time corresponding to a time required to perform the connection setup. However, when the UE transmits or receives large-sized data once or twice, it is ineffective to perform the connection setup. Accordingly, a connectionless transmission method may be considered to solve this problem.

SUMMARY OF THE INVENTION

Technical Objects

This specification provides a method and apparatus for transmitting a scheduling request in a wireless communication system.

Technical Solutions

This specification proposes a method and apparatus for transmitting a scheduling request in a wireless communication system. The apparatus may correspond to a user equipment (UE). The apparatus includes a radio frequency (RF) unit transmitting and receiving radio signals, and a processor being operatively connected to the RF unit.

The terms will first be defined. Rate matching refers to matching the size of data that are to be transmitted for each transmission unit time, e.g., TTI (or subframe), with a maximum transmission size of an actual channel. Therefore, rate matching is performed on inputted information (data) having channel coding performed therein.

Firstly, the UE receives resource allocation information indicating semi-persistent scheduling (SPS) resource and scheduling request (SR) resource from the base station.

The UE receives a first indicator indicating the activation or deactivation of the SPS resource and a second indicator indicating the activation or deactivation of SR resource from the base station. The SR resource is included in part of the SPS resource. More specifically, the base station may allocate the SPS resource for the uplink data transmission and may allocated the SR resource being included in part of the SPS resource to the UE via L1 or L2/L3 signaling.

The UE determines whether or not the transmission of the scheduling request can be performed based on the first indicator and the second indicator.

The UE transmits the scheduling request to the base station through the scheduling request resource, which is indicated by the resource allocation information.

Additionally, the UE may perform rate matching and may then be capable of transmitting uplink data to the base station. Thus, in a wireless communication system, the UE performs a scheduling request within an uplink data resource by using the SPS method and may then be capable of performing low latency high reliability communication.

More specifically, the UE performs rate matching for the uplink data, and, then, the UE may transmit the uplink data having the rate matching performed therein to the base station.

If the first indicator indicates the activation of the semi-persistent scheduling resource, and if the second indicator indicates the deactivation of the scheduling request resource, the data may be processed with rate matching in accordance with the size of part of the semi-persistent scheduling resource excluding the scheduling request resource. In other words, the UE may use the SR resource as resource for transmitting the uplink data.

If the first indicator indicates the activation of the semi-persistent scheduling resource, and if the second indicator indicates the activation of the scheduling request resource, the UE performs rate matching in accordance with the size of the SPS resource excluding the scheduling request resource. Thus, the UE may be capable of performing scheduling request even within the SPS resource.

Additionally, the UE may receive scheduling information as a response to the scheduling request, from the base station, without transmitting a buffer status report (BSR). At this point, the scheduling information may be determined based on a scheduling priority and the size of the uplink data. Herein, since information such as the scheduling priority and the size of the uplink data are shared in advance between the base station and the UE, there is no need to transmit a BSR. Thus, the procedure for performing uplink data transmission may become more simplified.

Additionally, the UE may receive first power control information for the transmission of the uplink data and second power control information for the transmission of the scheduling request from the base station. Even if the rate-matched scheduling request and the uplink data are transmitted at the same time, the required reliability levels for the scheduling request and the uplink data may be different from one another. Therefore, the scheduling request and the uplink data may be differentiated from one another by configuring different power levels that are used when transmitting the scheduling request and the uplink data.

Additionally, the UE may receive a first Modulation and Coding Scheme (MCS) that is used for the transmission of the uplink data and a second MCS that is used for the transmission of the scheduling request. If the first indicator indicates the activation of the SPS resource, and if the second indicator indicates the deactivation of the SR resource, the uplink data may be transmitted by using the first MCS. If the first indicator indicates the activation of the SPS resource, and if the second indicator indicates the activation of the SR resource, the uplink data and the scheduling request may be transmitted by using the second MCS. By having the base station transmit the modulation and coding scheme information by dividing the corresponding information to a first MCS and a second MCS, the UE may transmit the information that is related to the scheduling request in more detail. Additionally, the scheduling request may be transmitted through a Medium Access Control (MAC) header at the same time as the buffer status report (BSR). More specifically, by having the UE transmit the scheduling request and the buffer status report (BSR) to the base station at the same time from the MAC layer through the MAC header, a larger amount (or size) of information may be transmitted through the physical layer as compared to when transmitting the scheduling request.

Moreover, if the first indicator indicates the activation of the SPS resource, and if the second indicator indicates the deactivation of the SR resource, the uplink data may be transmitted to the base station through the SR resource. In this case, the UE may use the SR resource as resource for transmitting uplink data.

Furthermore, the SR resource may be assigned to a resource being adjacent to the uplink reference signal. Since the signaling request corresponds to a signal requiring a high reliability level, it is preferable to position the scheduling request to be near (or approximate to) the reference signal so that the channel can be accurately estimated.

Effects of the Invention

By using the proposed technique, scheduling request is allowed to be made within an uplink data channel. Thus, by reducing the number of allocations (or assignments) of scheduling request resources within an uplink control channel, scheduling request resources of the control channel may be efficiently managed.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi®), IEEE 802.16 (WiMAX®), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
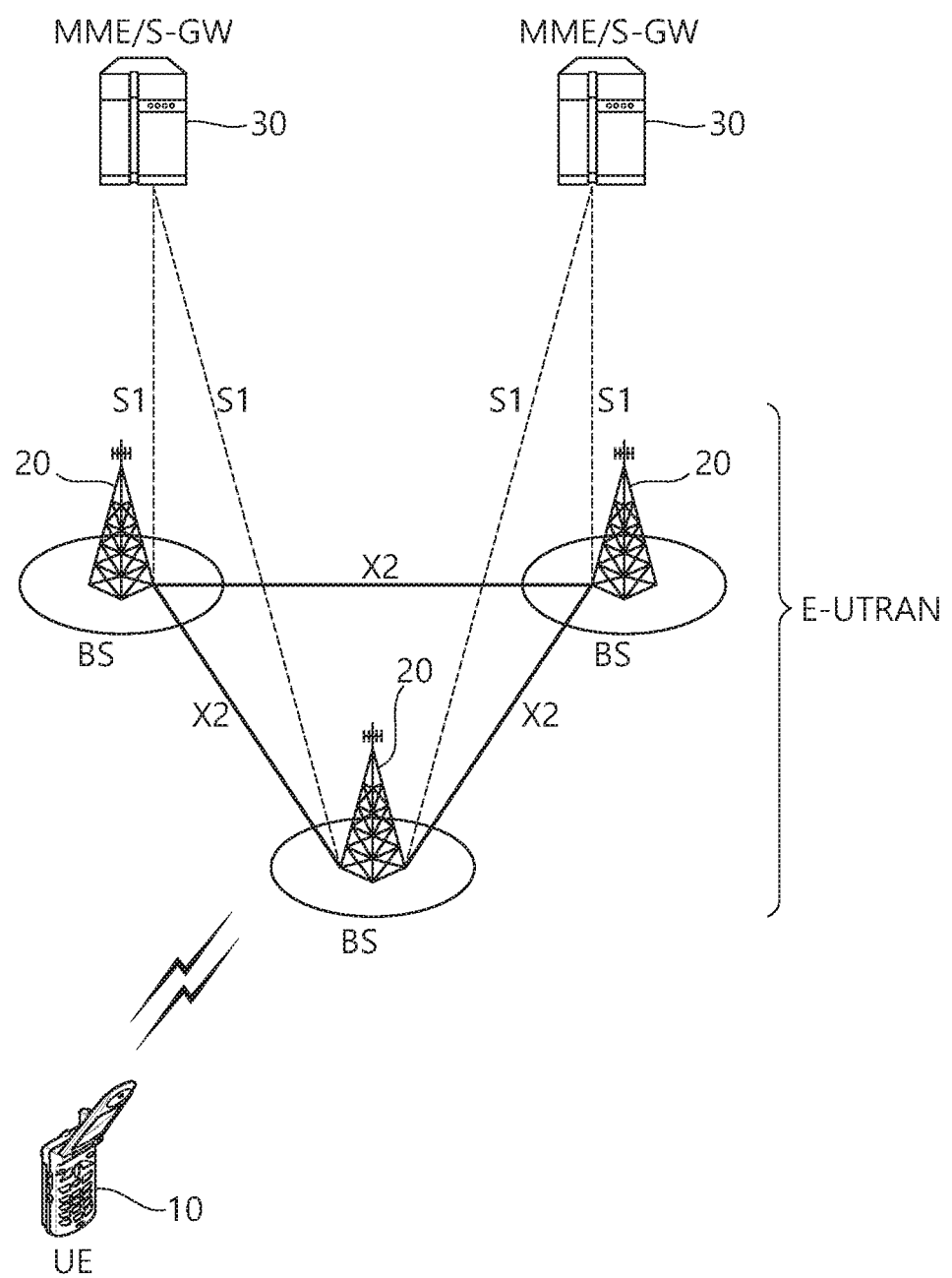
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, etc. The BS (20) is generally a fixed station that communicates with the UE (10) and may be referred to as another terminology, such as an evolved node-B (eNB), a base transceiver system (BTS), an access point, etc.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
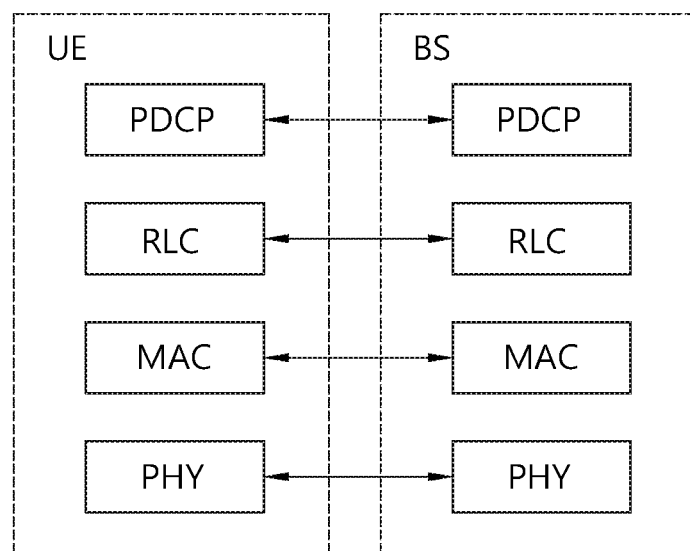
FIG. 2 is a diagram illustrating a radio protocol architecture for a user plane.
Figure 3:
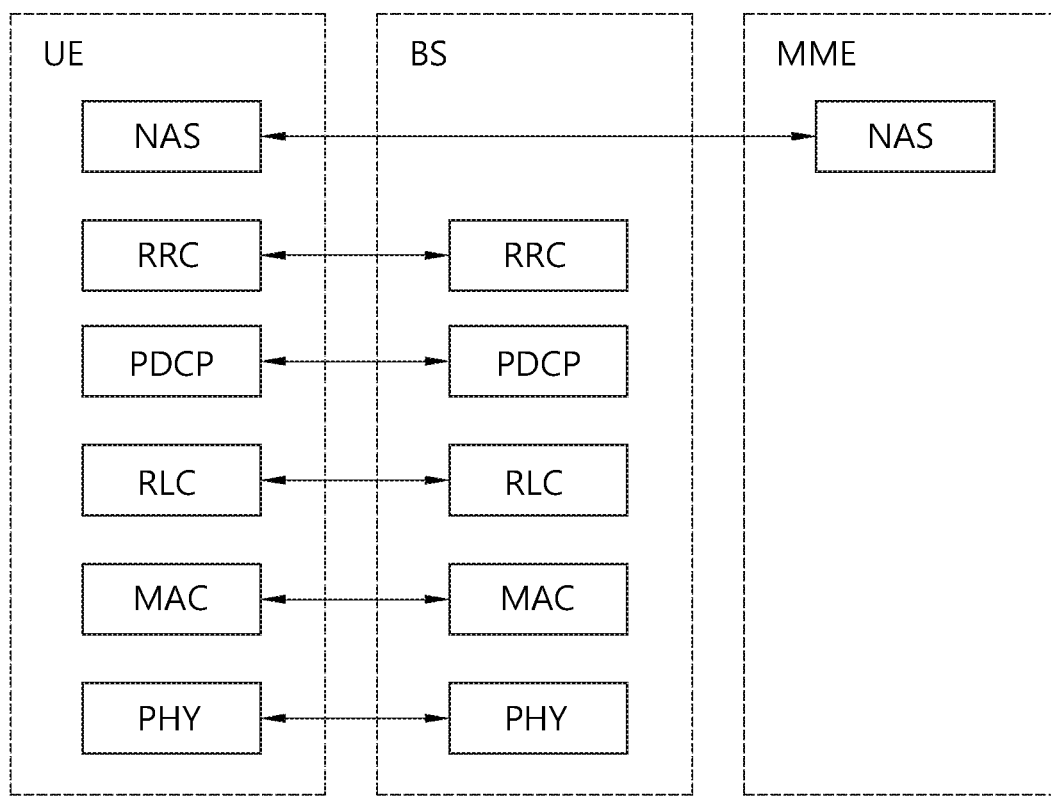
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
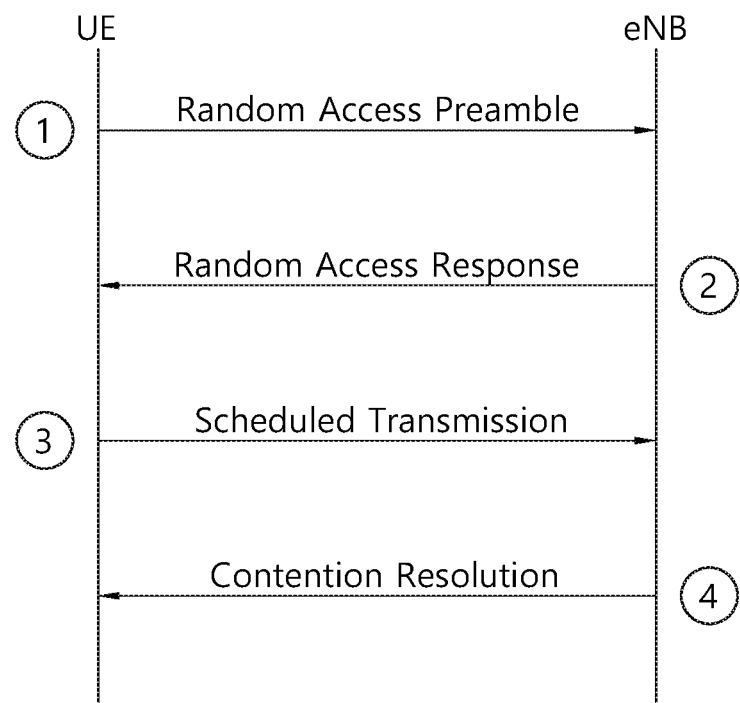
FIG. 4 shows a process of an operation performed between a user equipment (UE) and an eNodeB (eNB) in a contention-based random access procedure.

FIG. 4 shows a process of an operation performed between a UE and an eNB in a contention-based random access procedure.

First, in the contention-based random access, the UE may randomly select a random access preamble in a group of random access preambles indicated through system information or a handover command, may select a PRACH resource capable of transmitting the random access preamble, and may subsequently transmit the selected random access preamble to the eNB (step 1).

After transmitting the random access preamble, the UE may attempt to receive a response for the random access preamble in a random access response reception window indicated through the handover command (step 2). More particularly, the random access information may be transmitted in a form of a MAC PDU, and the MAC PDU may be transmitted on a physical downlink shared channel (PDSCH). Further, a physical downlink control channel (PDCCH) is transmitted so that the UE can properly receive information transmitted on the PDSCH. That is, the PDCCH includes information regarding a UE for receiving the PDSCH, frequency and time information of radio resources of the PDSCH, a transmission format of the PDSCH, or the like. Herein, if the PDCCH is successfully received, the UE may properly receive a random access response transmitted on the PDSCH according to information of the PDCCH. The random access response may include a random access preamble identifier (ID), an uplink (UL) grant, a temporary C-RNTI, a time alignment command (TAC), or the like. Herein, the random access preamble ID is included in the random access response. This is to inform the UE about which information is information regarding a UL grant, a temporary C-RNTI, a time alignment command among valid (available) information. As such, the random access preamble ID is necessary since one random access response may include random access information for one or more UEs. Herein, the random access preamble ID may be the same as a random access preamble selected by the UE in the step 1.

When the UE receives a random access response which is valid for the UE, the UE may process information included in the random access response. That is, the UE stores the temporary C-RNTI. In addition, the UE uses a UL grant to transmit data stored in a buffer of the UE to the eNB or to transmit newly generated data to the eNB (step 3). Herein, a UE identifier must be necessarily included in data included in the UL grant (message 3). The reason above is that, in the contention-based random access procedure, the eNB cannot determine which UEs perform the random access procedure, and the UEs must be identified for contention resolution at a later time. Herein, in order to include the UE identifier, two different methods may be provided. A first method is for transmitting a cell identifier of the UE through a UL grant as to whether the UE has already received a valid cell identifier assigned in a corresponding cell before the random access procedure. On the contrary, a second method is for transmitting a unique ID of the UE if the UE does not receive the valid cell ID before the random access procedure. In general, the unique identifier of the UE is longer than the cell identifier. If the UE has already transmitted data through the UL grant in step 3, the UE starts a contention resolution timer.

After data is transmitted together with an identifier through the UL grant included in the random access response, the UE waits for an indication or instruction of an eNB for the contention resolution. That is, the UE attempts a reception of a PDCCH to receive a specific message (step 4). Herein, two methods are present to receive the PDCCH. As described above, if the UE identifier transmitted through the UL grant is a cell identifier, the UE attempts a reception of the PDCCH by using a cell identifier of the UE. If the UE identifier transmitted through the UL grant is a unique identifier of the UE, the UE attempts a reception of the PDCCH by using a temporary C-RNTI included in the random access response. Thereafter, in the former case, if the PDCCH (message 4) is received through the cell identifier before the contention resolution timer expires, the UE determines that the random access procedure is successfully performed, and finishes the random access procedure. In the latter case, if the PDCCH is received through the temporary cell identifier before the contention resolution timer expires, the UE checks data (message 4) transmitted by a PDSCH indicated by the PDCCH. If the unique identifier of the UE is included in the data, the UE determines that the random access procedure is successfully performed, and finishes the random access procedure.

Hereinafter, semi-persistent scheduling (SPS) is described.

In a next-generation communication system, the SPS is required for a plurality of UEs. An Internet of Things (IoT) service of various industries is expected to be introduced in the next-generation communication system. Representative examples thereof include an automobile, a drone, or the like. In these services, location information is expected to be updated in unit of 100 millisecond (ms) to 1 second (s) to manage autonomous driving and to prevent accidents. When the location information is updated periodically, the SPS is applied in general to decrease an overhead of an unnecessary control channel.

Figure 5:
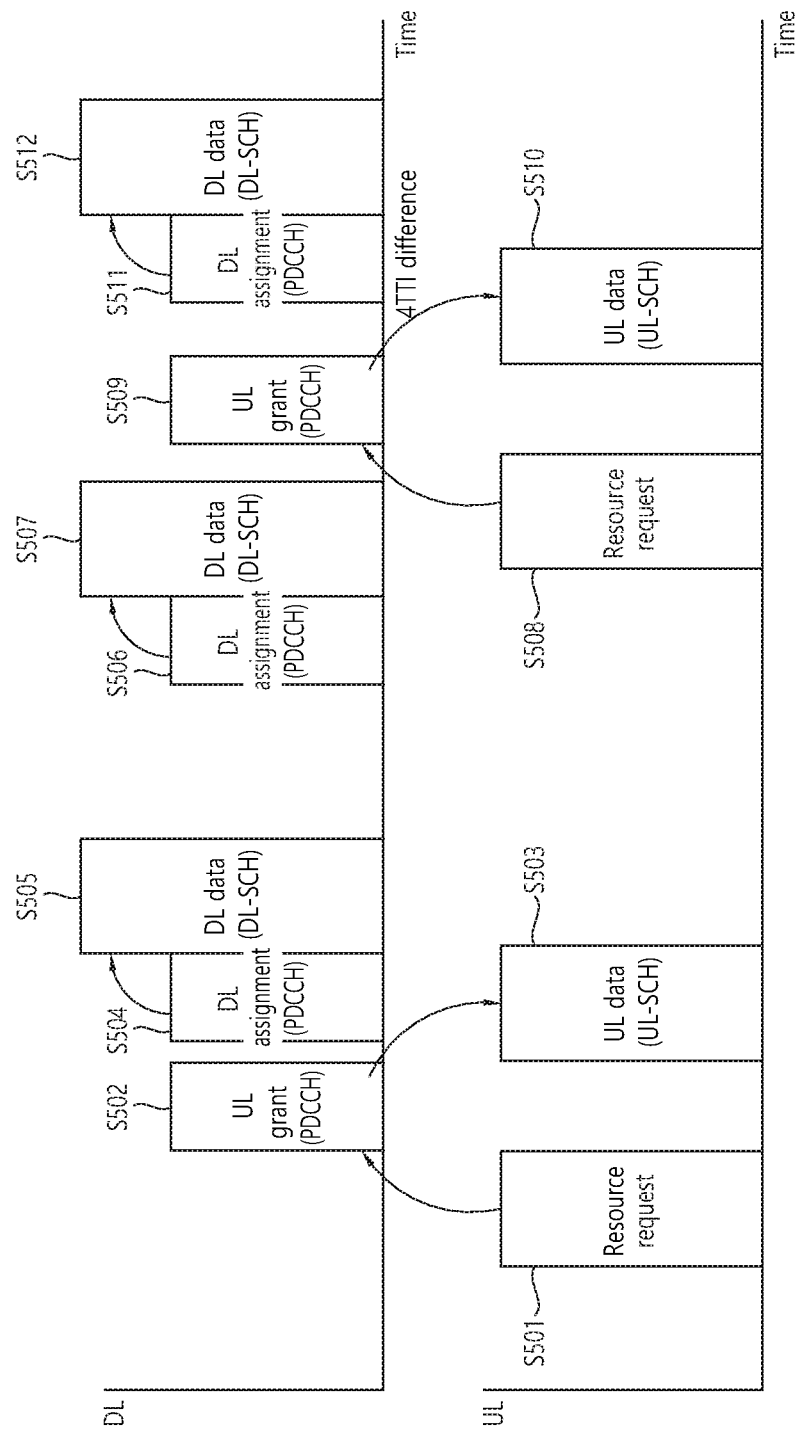
FIG. 5 is a drawing for explaining a method of dynamically assigning a radio resource.
Figure 6:
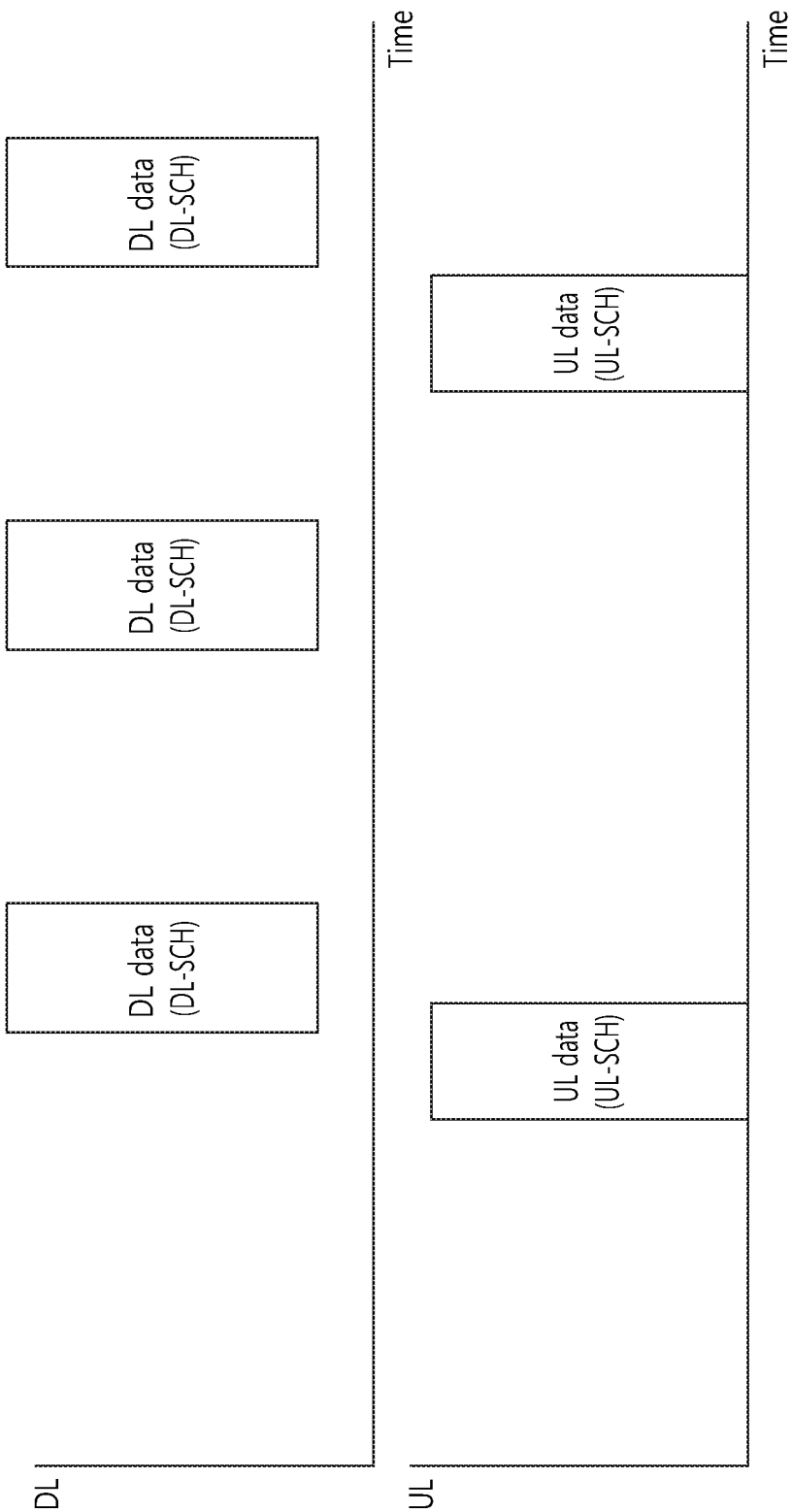
FIG. 6 is a drawing for explaining a semi-persistent scheduling (SPS) method.

FIG. 5 is a drawing for explaining a method of dynamically assigning a radio resource. FIG. 6 is a drawing for explaining an SPS method.

A typical process of transmitting data from a UE to an eNB (a method of dynamically assigning a radio resource) is described below with reference to FIG. 5. First, the UE may request the eNB to provide a radio resource required for transmission of generated data (S501). Therefore, the eNB may assign the radio resource through a control signal according to a radio resource request of the UE (S502). In an LTE system, the resource assignment of the eNB for transmitting UL data of the UE may be transmitted through a UL grant transmitted through a PDCCH. Therefore, the UE may transmit data to the eNB through the assigned radio resource (S503). The radio resource request of the UE, the resource assignment of the eNB, and corresponding UL data transmission of the UE may be optionally repeated (S508 to S510).

Meanwhile, when the eNB transmits downlink (DL) data to the UE, a DL assignment message may be transmitted to the UE through the PDCCH to know through which radio resource the data transmitted to the UE is transmitted (S504), and the eNB may transmit data to the UE through a radio resource corresponding to the DL assignment message (S505). In this case, DL assignment information transmission and DL data transmission through a radio resource corresponding thereto may be achieved in the same transmission time interval (TTI). Further, as shown in FIG. 5, the DL data transmission procedure may be repeated.

A method of assigning an SPS radio resource is a method in which first and second steps are skipped in three steps for transmitting data to the eNB (i.e., (1) the resource request of the UE, (2) the resource assignment of the eNB, and (3) the data transmission of the UE according to the resource assignment). Accordingly, the UE may perform a process of transmitting data directly without the aforementioned first and second steps, i.e., the step of requesting the radio resource and the step of assigning the radio resource, on the basis of a configuration of the radio resource. The concept of the SPS method is shown in FIG. 6. That is, in the SPS method, the eNB does not have to transmit radio resource assignment information all the time through the PDCCH.

Figure 7:
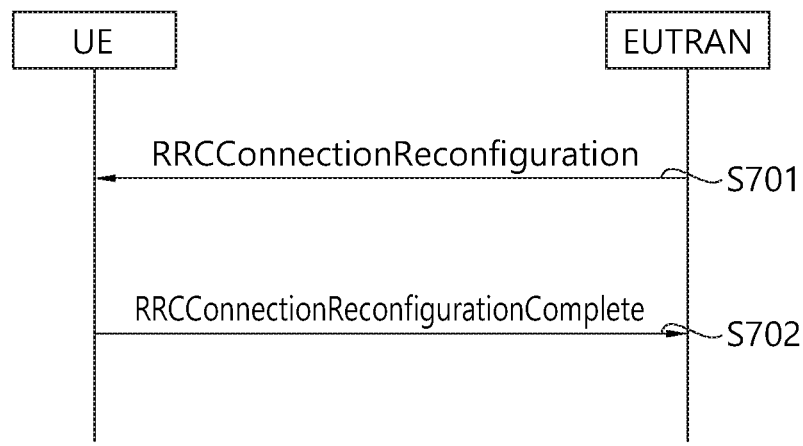
FIG. 7 is a drawing showing an RRC signaling flow between a UE and an eNB for an SPS configuration.
Figure 8:
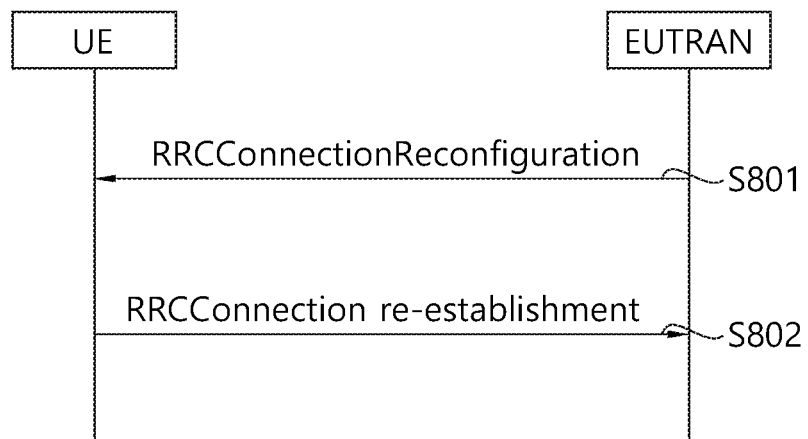
FIG. 8 is a drawing showing an RRC signaling flow between a UE and an eNB for an SPS configuration.

FIG. 7 and FIG. 8 are drawing showing an RRC signaling flow between a UE and an eNB for an SPS configuration.

More specifically, FIG. 7 is a drawing showing a case where a radio resource control (RRC) connection is successfully set up between the eNB and the UE, and FIG. 8 is a drawing showing a case where an RRC connection is not successfully set up between the eNB and the UE.

First, the eNB may transmit an RRC connection reconfiguration message to the UE through RRC signaling (S701, S801). The RRC connection reconfiguration message may include a radio resource configuration information element (IE), more specifically, radioResourceConfigDedicated, and the radio resource configuration IE may include an SPS configuration IE (sps-Config IE). The SPS configuration ID may include basic information regarding the SPS configuration such as a radio resource assignment period or the like for the SPS. Upon receiving the information, if the UE successfully sets up the RRC connection, an RRC connection reconfiguration complete message may be transmitted to the eNB (S702). Unlike this, if the RRC connection is not successfully set up, a configuration between the eNB and the UE may be adjusted by exchanging the RRC connection re-establishment message (S802).

Hereinafter, connectionless transmission will be described.

In a 3GPP LTE system, a UE in an idle state must perform an RRC connection setup and a data connection setup before data transmission is performed. This means that both of a logical connection (RRC connection) between an eNB and the UE and a logical connection (S1 connection/interface, EPS connection) between a mobility management entity (MME) and the UE are set up.

Figure 9:
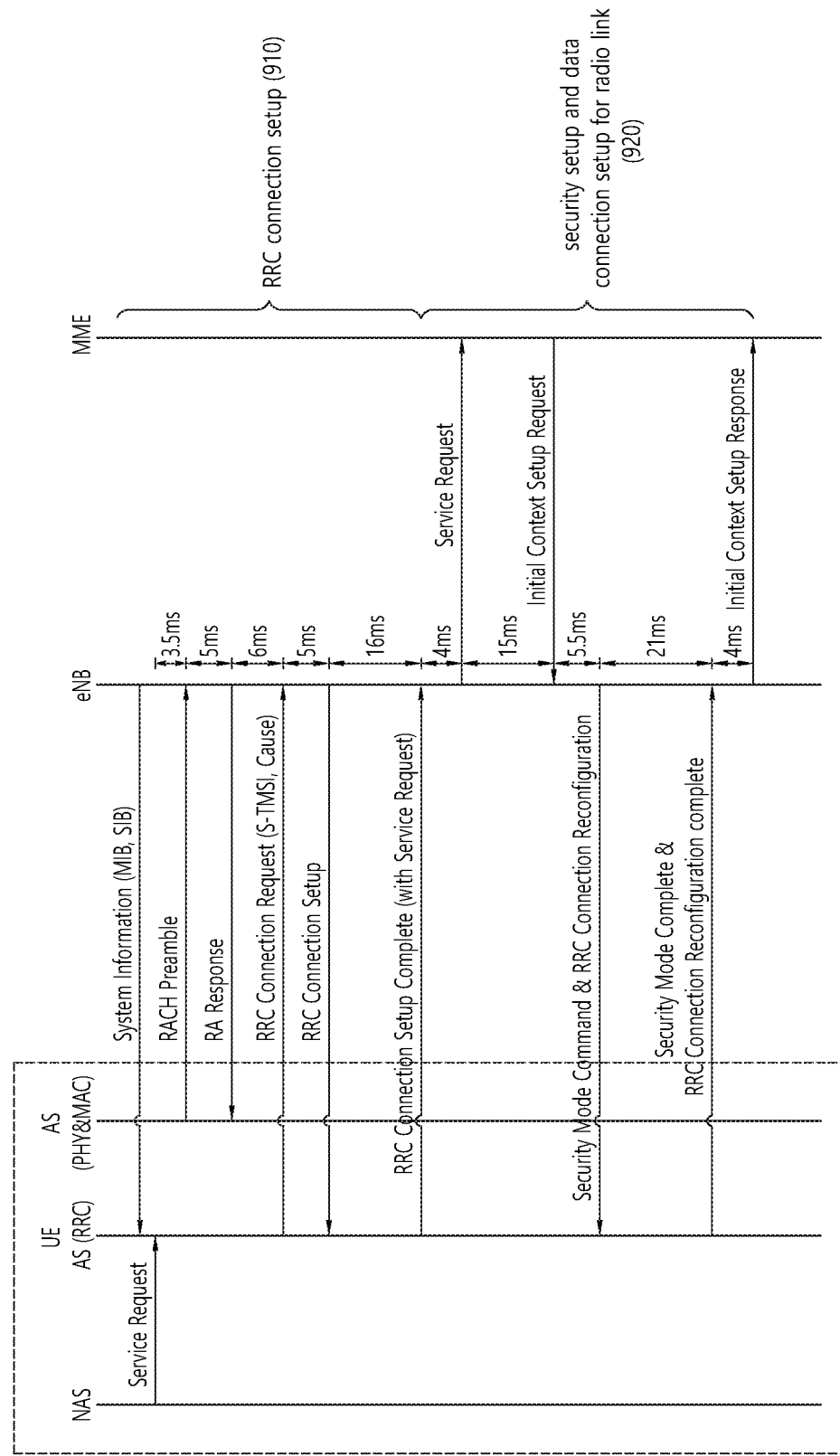
FIG. 9 shows a connection setup procedure and a required time in $3^{rd}$ generation partnership project (3GPP) long term evolution (LTE).

FIG. 9 shows a connection setup procedure and a required time in 3GPP LTE.

Referring to FIG. 9, a UE first performs an RRC connection setup (see 910) with an eNB before transmitting data. The UE receives system information such as a master information block (MIB) and a system information block (SIB) from the eNB. In addition, the UE transmits a random access preamble through an RACH resource, and receives a random access response in response thereto. Thereafter, the UE transmits an RRC connection request to the eNB, and receives an RRC connection setup message from the eNB. When the UE transmits an RRC connection setup complete message to the eNB, the RRC connection setup (see 910) may be performed.

When the RRC connection setup (see 910) is performed with respect to the eNB, the UE performs a security setup and data connection setup for a radio link (see 920) with respect to a mobility management entity (MME). The eNB transmits a service request to the MME, and the MME transmits an initial context setup request to the eNB. The eNB transmits security mode command and RRC connection reconfiguration messages to the UE. The UE transmits security mode complete and RRC connection reconfiguration complete messages to the eNB. Thereafter, the eNB transmits an initial context setup request to the MME. In doing so, the UE may perform the security setup and data connection setup for the radio link (see 920) with respect to the MME.

Since it takes 35.5 ms in total for the RRC connection setup (see 910) and it takes 49.5 ms in total for the security setup and data connection setup for the radio link (see 920), it takes 85 ms in total as a time for transitioning a connected state of the UE in the idle state.

If it is intended to transmit UL data after transitioning the connected state of the UE, the UE must undergo a step of transmitting a scheduling request to the eNB. A procedure of transmitting the UL data and a delay caused thereby are described below with reference to FIG. 10 and FIG. 11.

Figure 10:
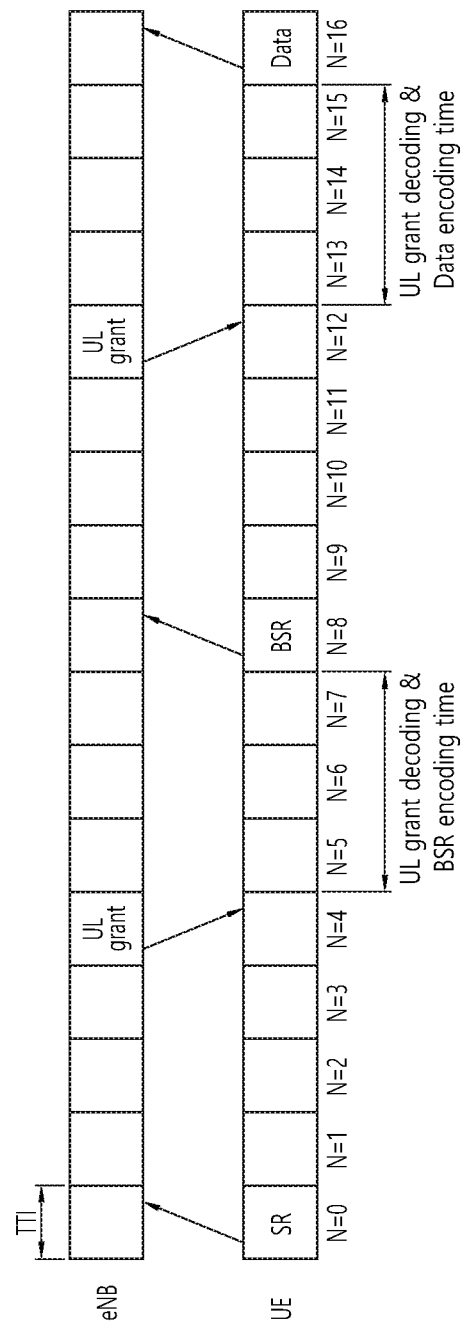
FIG. 10 shows a required time in a method of assigning an uplink resource through a scheduling request in 3GPP LTE.

FIG. 10 shows a required time in a method of assigning a UL resource through a scheduling request in 3GPP LTE.

Referring to FIG. 10, a UE transmits a scheduling request (SR) to an eNB, and the eNB transmits a UL grant to the UE. The UE decodes the UL grant during a specific duration, and encodes a buffer status report (BSR). Thereafter, the UE transmits the encoded BSR to the eNB, the eNB transmits the UL grant to the UE, and the UE transmits data to the eNB according to the UL grant. The method of assigning the UL resource through the SR may generate a delay of 9.5 ms in total.

Figure 11:
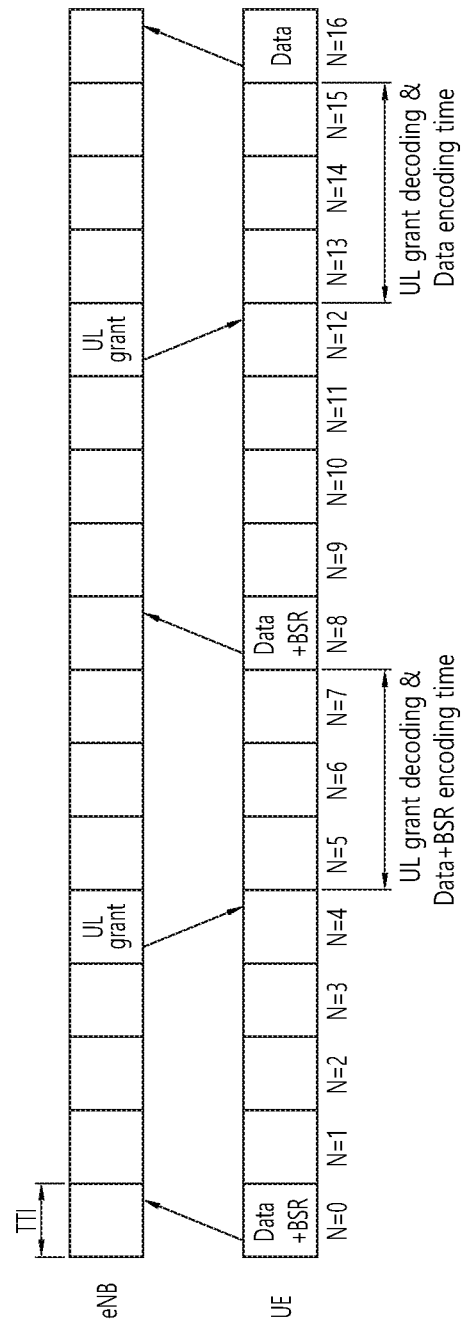
FIG. 11 shows a required time in a method of assigning an uplink resource through a scheduling request (SR) and a buffer status report (BSR) in 3GPP LTE.

FIG. 11 shows a required time in a method of assigning a UL resource through a scheduling request (SR) and a buffer status report (BSR) in 3GPP LTE.

Referring to FIG. 11, a UE transmits data and a BSR to an eNB, and the BS transmits a UL grant to the UE. The UE decodes the UL grant during a specific duration, and encodes the data and the BSR. Thereafter, the UE transmits the encoded data and BSR to the eNB, the eNB transmits the UL grant to the UE, and the UE transmits data to the eNB according to the UL grant. The method of assigning the UL resource through the SR and the BSR of the UE may generate a delay of 17.5 ms in total.

That is, it may take 9.5 ms to 17.5 ms in total as a time of occupying a radio resource and transmitting data by a UE which has transitioned to a connected state. Since it takes 85 ms in total as a time required for the UE in the idle state to transition to the connected state, it may take 94 ms to 102.5 ms in total as a time required for the UE in the idle state to transmit data. Accordingly, a connectionless transmission method may be considered to decrease a delay time depending on the transitioning of the connected state of the UE.

In general, when there is no data to be transmitted, the UE transitions to a discontinuous reception mode or an idle state to achieve power saving or to decrease a network overhead. In the discontinuous reception mode in which a connection set up with the eNB is maintained, a handover is performed when the UE moves between the eNBs. However, in a situation where too many UEs are connected to a single eNB and all UEs are moving UEs, there is a disadvantage in that a signaling overhead is increased in a radio duration for performing the handover. Further, there is a disadvantage in that the UE has to perform the handover frequently when a communication eNB having a small coverage such as a road side unit is installed. Therefore, the connectionless transmission method may be used to decrease the signaling overhead in the radio duration caused by the handover Herein, the SPS may be applied to both of a case where the UE is in a connected state and a case where the UE is in a disconnected (or non-connected) state. However, when the UE is in the disconnected state, reducing influence that is caused by an inconsistency in the uplink synchronization by emptying (puncturing) part of the SPS resources is needed to be performed. More specifically, in order to eliminate interference on an adjacent symbol and an adjacent subcarrier that caused by an inconsistency in the uplink synchronization, among the SPS resource block, part of the resources is emptied. In case the coverage of a Road Side Unit (RSU) is small, since the inconsistency in the time synchronization (sync) of the uplink is shorter (or smaller) than a length of a Cyclic Prefix (CP) duration, the inconsistency may be disregarded (or ignored). However, in case the inconsistency in the time synchronization is longer (or larger) than the CP, it is needed to prevent signals that precede and follow one another from overlapping one another by emptying part of the resources. Additionally, due to the inconsistency in the uplink synchronization, the signal that is transmitted from the UE may generate an out of band emission to the signals located above and below the corresponding signal. In order to reduce the influence caused by the out of band emission, the upper subcarrier and the lower subcarrier remain empty (or vacant) without transmitting any signals.

In services provided in automobiles, drones, and so on, when an urgent signal is generated, such as a collision warning, the corresponding signal needs to be quickly delivered (or transmitted) to a neighboring (or adjacent) UE within 10 ms-100 ms. In order to do so, it may be preferable to assign (or allocate) resources that are dedicated to scheduling requests to all UEs. However, when considering the number of automobiles travelling on the roads, there lies a disadvantage in that an excessive number of resources may be wasted for the purpose of scheduling requests.

In order to efficiently ensure scheduling request resources, data transmission resources of IoT devices (or UEs), such as automobiles and drones, which periodically update signals, should be used for the purpose of scheduling requests. When applying the above-described technique to a UE that is in a disconnected transmission state, when the UE being in the disconnected transmission state transmits an uplink signal, the corresponding UE may transmit a scheduling request without using the legacy (or conventional) random access resource. More specifically, in case of performing a disconnected transmission by using a random access procedure, although there may always exist a risk of collision between preambles or transmission signals, when using the above-described technique, it will also be advantageous in that the UE may be capable of performing scheduling request without any risk of collision.

This specification proposes a method for performing a scheduling request in an uplink resource, which is allocated by using the SPS method, in order to efficiently manage a scheduling request (SR) resource of the control channel. Additionally, this specification proposes a method enabling the base station and a UE to operate even in a case where the reliability of a scheduling request signal and the reliability of an uplink signal within the SPS resource are different from one another.

Hereinafter, a technique (or method) enabling scheduling request to be performed within resources (SPS resources) in case multiple UEs are periodically assigned with the corresponding resources for uplink data transmission.

<Proposed Technique 1>

A base station performs semi-persistent scheduling of resources for uplink data transmission to a UE via L2/L3 signaling. This is referred to as an SPS resource. At this point, among the SPS resources, part of the resources is assigned as resource for scheduling request. This is referred to as an SR resource.

Data that are transmitted by a UE in the SPS resource correspond to signals having a comparatively low level of importance, such as position information. However, the scheduling request may correspond to signals having a high level of importance for urgent high-reliability communication. Therefore, modulation and coding schemes should be separately determined so that a higher reliability can be assigned to the scheduling request signal as compared to the uplink data signal. More specifically, a physical channel for uplink data transmission within an SPS resource and a physical channel for scheduling request should be separately configured.

For example, an SR within an SPS resource may be delivered in the form of a sequence. The sequence format possessing the SR may correspond to the same sequence (e.g., DMRS) as the sequence that is used for data transmission within the SPS resource. Herein, when a sequence length of a DMRS is given as L, the sequence being applied to the SR may correspond to nL. N is an integer that is equal to or greater than 1. Alternatively, the SR according to the exemplary embodiment of this specification may be encoded separately from the data signal. More specifically, when the data is encoded with a Low Density Parity Check (LDPC) code, the SR may be encoded with a polar code and may then be transmitted from the SPS resource.

For example, the base station indicates the deactivation or activation of the SPS resource and the deactivation or activation of the SR resource to the UE via L1 or L2/L3 signaling. The UE that has not received the deactivation indication may regard both the SPS resource and the SR resource within the SPS resource as activated resources.

Since a situation requiring the SPS resource to be quickly released (or cancelled) by using the deactivation indicator (or activation indicator) may occur, the base station should be capable of dynamically transmitting the deactivation indicator by using L1 signaling. For example, a deactivation indicator that is received via L1 signaling may be used for the purpose of releasing (or cancelling) the SPS resource only in a specific subframe. Herein, the specific subframe may correspond to a subframe that has received the deactivation indicator. Additionally, the deactivation indicator that is received via L2/L3 signaling may be used for the purpose of permanently (or persistently) releasing (or cancelling) the SPS resource. As another example, when a deactivation indicator is received via L1 signaling, the corresponding deactivation indicator may be used for the purpose of permanently (or persistently) releasing (or cancelling) the SPS resource.

For example, by increasing DMRS-dedicated resources that are assigned within the SPS resource via L2/L3 signaling, the activation and/or deactivation of the SR resource may be implicitly indicated. If a resource being assigned to the DMRS corresponds to Resource 1, the SR resource may be indicated to be deactivated. And, if resources being assigned to the DMRS correspond to Resource 1 and Resource 2, the SR resource may be indicated to be activated. This may be used in a case where the sequence used for SR transmission is identical to the DMRS. At this point, when performing SR transmission, by transmitting a sequence being assigned to both Resource 1 and Resource 2, the UE may notify (or announce) the SR transmission. At this point, when performing SR transmission, by detecting the sequence being assigned to both Resource 1 and Resource 2 and by combining the signals, the base station may determine whether or not the UE has performed the SR transmission, or the base station may perform channel estimation by using the sequence of Resource 1 and may determine whether or not the UE has performed the SR transmission by detecting only Resource 2.

For example, when the SPS resource is activated, the UE may transmit the uplink data. Additionally, when both the SPS resource and the SR resource are activated, scheduling request within the SPS resource may be performed. If the SPS resource is activated and the SR resource is deactivated (or not activated), the UE may use the SR resource as resource for performing uplink data transmission, and the UE may perform rate matching accordingly. If the SPS resource is activated and the SR resource is activated, the UE performs rate matching for the uplink data in accordance with the SPS resource excluding the SR resource.

As another example, if the SPS resource is activated for a random UE, the corresponding UE may transmit the uplink data. Additionally, regardless of the activation or deactivation of the SPS resource, the UE may perform scheduling request. The UE having its SPS resource activated performs rate matching for the uplink data in accordance with the SPS resource excluding the SR resource.

The above-described details may be applied in a case where the same SPS resource is assigned to multiple UEs. The base station may differently select a UE to which the base station is to transmit data within the SPS resource and a UE that is capable of performing a scheduling request. Therefore, even in a case where the SR resource is not activated for a random UE, the corresponding SR resource may be activated for other UEs.

As another example, the base station notifies (or announces) whether or not the SPS resource is deactivated to the UE via L1 or L2/L3 signaling. In case the SPS resource is activated, the UE selects one of two different operations. A first operation corresponds to performing scheduling request by using the SR resource within the SPS resource, and a second operation corresponds to transmitting uplink data from the SR resource within the SPS resource in a case where there is no need to perform the scheduling request.

When applying the above-described examples, in case the UE is not required to perform scheduling request, since the UE additionally transmits data by using the SR resource, it is advantageous in that the uplink data are transmitted efficiently. However, for the base station, an overhead may occur due to the process of determining whether the UE has transmitted a scheduling request signal from the SR resource or whether the UE has transmitted data.

The operating method of the UE is as described below. In case the UE uses the SR resource for the purpose of uplink data transmission, the UE considers both the data transmission resource and the SR resource as resource dedicated to data transmission. Thereafter, the UE performs rate matching accordingly and then transmits the uplink data.

The operating method of the base station is as described below. The base station estimates a channel through an uplink reference signal. Thereafter, the base station detects a scheduling request signal and determines whether or not a scheduling request exists. If the base station determines that a scheduling request does not exist, the base station considers that the scheduling request resource has been used for data transmission, and, then, the base station performs decoding of the uplink data. If the base station determines that the scheduling request exists, the base station considers that the scheduling request data have been used for the purpose of data transmission and then performs decoding of the uplink data.

A signal (sequence) that is transmitted from the SR resource is detected by the base station prior to decoding the uplink data by using an on/off keying method. Therefore, the base station determines whether or not a scheduling request exists by performing power detection of a reception signal. Generally, since the power detection is simpler than the decoding process, if the base station performs the operation of detecting power by using a sequence, the base station may reduce the overhead. More specifically, the base station calculates an auto-correlation value of the sequence, and, if a peak value is not found, the base station considers that there is no power detection for the scheduling request. And, therefore, the base station determines that a scheduling request does not exist.

As another example, the base station notifies (or announces) the activation or deactivation of an SPS resource to the UE via L1 or L2/L3 signaling. If the SPS resource is activated, the SR resource being included in the SPS resource may always be activated at the same time as the SR resource. Even in a case where the UE is not required to perform a scheduling request, the UE may leave the SR resource empty (or vacant) without transmitting any data.

As another example, the base station may assign (or allocate) the SR resource to a resource that is approximate to the reference signal. Since the receiving end is capable of estimating a channel more accurately as it becomes closer to the reference signal, it is preferable to position a scheduling request signal, which requires high reliability, near the reference signal. Generally, since the required reliability level of a control signal, such as a scheduling request signal, is higher than the required reliability level of a data signal, it is preferable to position the scheduling request signal near the reference signal.

As another example, the base station may transmit power control information for transmitting uplink data within an SPS resource and power control information for a scheduling request to the UE. Even if the scheduling request within the SPS resource and the transmission of the uplink data are performed at the same time, the required reliability level of the scheduling request and the uplink data may be different from one another. Therefore, the power that is used when transmitting the scheduling request and the uplink data should be configured differently. Generally, the power for the scheduling request may be configured to be greater than the power for the uplink data transmission within the SPS resource.

As another example, a scheduling priority, a data size, and so on, that are to be applied when the scheduling request is performed within the SPS resource may be shared in advance between the base station and the UE. By doing so, when the base station receives the scheduling request from the UE through the SPS resource, the base station delivers the uplink scheduling information to the UE by using the information, which was shared in advance, without performing any request for a buffer status report (BSR). If the scheduling request that is being transmitted within the SPS resource corresponds to a resource for low latency high reliability communication (e.g., in case a signal is required to be urgently transmitted due to a car accident that has just occurred), the procedure for uplink data transmission should be simplified as much as possible.

<Proposed Technique 2>

A base station performs semi-persistent scheduling of resources for uplink data transmission to a UE via L2/L3 signaling. Additionally, the base station transmits both of first MCS information, which corresponds to Modulation and Coding Scheme information that is to be used when performing the uplink data transmission, and second MCS information, which corresponds to Modulation and Coding Scheme that is to be used when performing an uplink scheduling request, to the UE. In case the UE does not perform the scheduling request, the UE transmits data by using the first MCS information, and, in case the UE performs the scheduling request, the UE transmits data by using the second MCS information. The base station performs blind decoding on the received signal by using both the first MCS information and the second MCS information.

The Proposed Technique 2 is advantageous in that it is capable of transmitting the information related to the scheduling request more specifically (or in more detail) as compared to the Proposed Technique 1. However, there also lies a disadvantage in that the base station is required to perform blind decoding by using two types of MCS (first MCS information and second MCS information).

More specifically, in case the UE performs a scheduling request, the format of the MAC header is modified accordingly. In the Proposed Technique 1, the UE performs the scheduling request within a specific resource of the physical layer. However, in the Proposed Technique 2, by transmitting the scheduling request and the buffer status report (BSR) at the same time to the base station from the MAC layer through the MAC header, the UE may simplify the procedure for performing uplink transmission. In other words, in case of the Proposed Technique 2, since the scheduling request is performed by using all of the data resources, a larger amount of information may be transmitted as compared to the Proposed Technique 1. Accordingly, the UE may also transmit the BSR information more specifically (or in more detail).

As another example, in case the UE transmits the scheduling request information and the BSR information by using the second MCS information, the UE may transmit a sequence indicating the scheduling request within a specific resource. In order to reduce the overhead that occurs when applying the Proposed Technique 2, as proposed in the Proposed Technique 1, the UE may transmit a sequence indicating that the UE has transmitted the scheduling request within specific resources (REs). When a sequence is detected within the specific resource, this indicates that the scheduling request has been performed and that the data have been encoded by using the second MCS information.

At this point, the operating method of the base station is as described below. The base station estimates a channel through an uplink reference signal. Thereafter, the base station detects a sequence that is used when performing the scheduling request and determines whether or not a scheduling request exists. If the base station determines that a scheduling request does not exist, the base station performs the decoding of the uplink data by using the first MCS information. If the base station determines that the scheduling request exists, the base station performs decoding of the uplink data by using the second MCS information.

Figure 12:
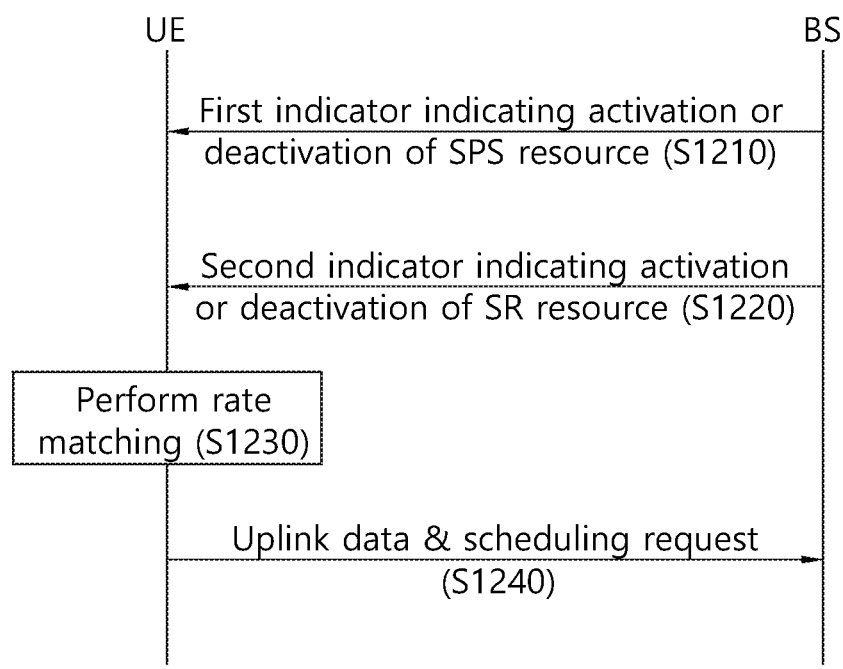
FIG. 12 is a diagram showing an example of transmitting uplink data and a scheduling request through an SPS resource according to an exemplary embodiment of this specification.

In order to facilitate the understanding of the above-described exemplary embodiments of this specification, the procedure for transmitting the uplink data and the scheduling request through the SPS resource will be illustrated in FIG. 12.

FIG. 12 is a diagram showing an example of transmitting uplink data and a scheduling request through an SPS resource according to an exemplary embodiment of this specification.

The base station (BS) assigns (or allocates) SPS resource for uplink data transmission to the user equipment (UE) via L1 or L2/L3 signaling and then assigns SR resource that is included in part of the SPS resource. The UE receives a first indicator indicating the activation or deactivation of the SPS resource and a second indicator indicating the activation or deactivation of SR resource from the base station (S1210, S1220).

If the first indicator indicates the activation of the SPS resource, and if the second indicator indicates the deactivation of the SR resource, the UE performs rate matching in accordance with the size of the SPS resource that includes the SR resource (S1230). In other words, the UE may use the SR resource as resource for transmitting the uplink data. Additionally, if the first indicator indicates the activation of the SPS resource, and if the second indicator indicates the activation of the SR resource, the UE performs rate matching in accordance with the size of the SPS resource excluding the SR resource (S1230).

The UE transmits uplink data having the scheduling request and rate matching performed therein to the base station (S1240). More specifically, in case the first indicator indicates the activation of the SPS resource, and if the second indicator indicates the deactivation of the SR resource, the UE transmits the uplink data through the SPS resource, which includes the SR resource. Additionally, in case the first indicator indicates the activation of the SPS resource, and if the second indicator indicates the activation of the SR resource, the UE transmits uplink data through the SPS resource excluding the SR resource and transmits a scheduling request through the SR resource.

Thus, in case multiple UEs are periodically assigned with resources for transmitting uplink data, by allowing scheduling request to be performed within the SPS resource, the SR resource may be efficiently managed.

Figure 13:
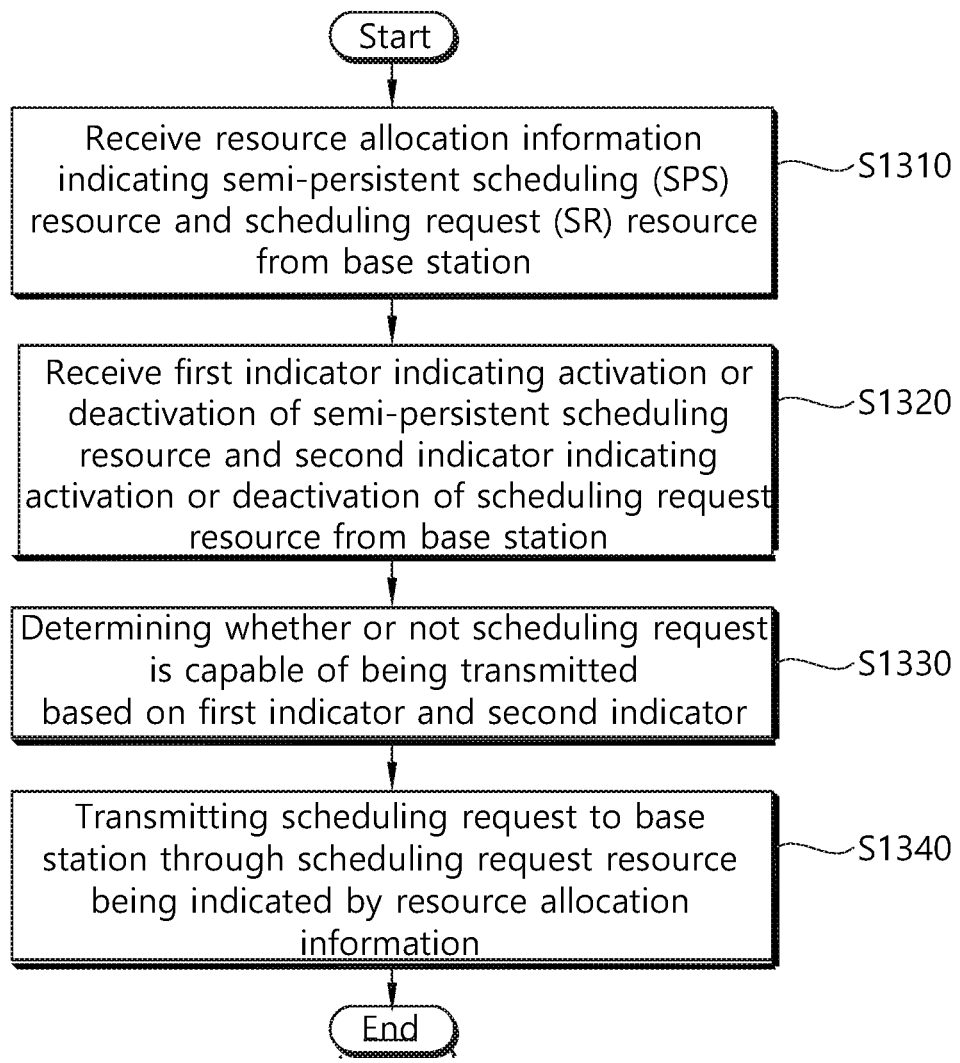
FIG. 13 is a flow chart showing a procedure of transmitting uplink data and a scheduling request through an SPS resource according to an exemplary embodiment of this specification.

FIG. 13 is a flow chart showing a procedure of transmitting uplink data and a scheduling request through an SPS resource according to an exemplary embodiment of this specification.

Firstly, the terms will be defined. Rate matching refers to matching the size of data that are to be transmitted for each transmission unit time, e.g., TTI (or subframe), with a maximum transmission size of an actual channel. Therefore, rate matching is performed on inputted information (data) having channel coding performed therein.

In step S1310, the UE receives resource allocation information indicating semi-persistent scheduling (SPS) resource and scheduling request (SR) resource from the base station.

In step S1320, the UE receives a first indicator indicating the activation or deactivation of the SPS resource and a second indicator indicating the activation or deactivation of SR resource from the base station. The SR resource is included in part of the SPS resource. More specifically, the base station may allocate the SPS resource for the uplink data transmission and may allocated the SR resource being included in part of the SPS resource to the UE via L1 or L2/L3 signaling.

In step S1330, the UE determines whether or not the transmission of the scheduling request can be performed based on the first indicator and the second indicator.

In step S1340, the UE transmits the scheduling request to the base station through the scheduling request resource, which is indicated by the resource allocation information.

Additionally, the UE may perform rate matching and may then be capable of transmitting uplink data to the base station. Thus, in a wireless communication system, the UE performs a scheduling request within an uplink data resource by using the SPS method and may then be capable of performing low latency high reliability communication.

More specifically, the UE performs rate matching for the uplink data, and, then, the UE may transmit the uplink data having the rate matching performed therein to the base station.

If the first indicator indicates the activation of the semi-persistent scheduling resource, and if the second indicator indicates the deactivation of the scheduling request resource, the data may be processed with rate matching in accordance with the size of part of the semi-persistent scheduling resource excluding the scheduling request resource. In other words, the UE may use the SR resource as resource for transmitting the uplink data.

If the first indicator indicates the activation of the semi-persistent scheduling resource, and if the second indicator indicates the activation of the scheduling request resource, the UE performs rate matching in accordance with the size of the SPS resource excluding the scheduling request resource. Thus, the UE may be capable of performing scheduling request even within the SPS resource.

Additionally, the UE may receive scheduling information as a response to the scheduling request, from the base station, without transmitting a buffer status report (BSR). At this point, the scheduling information may be determined based on a scheduling priority and the size of the uplink data. Herein, since information such as the scheduling priority and the size of the uplink data are shared in advance between the base station and the UE, there is no need to transmit a BSR. Thus, the procedure for performing uplink data transmission may become more simplified.

Additionally, the UE may receive first power control information for the transmission of the uplink data and second power control information for the transmission of the scheduling request from the base station. Even if the rate-matched scheduling request and the uplink data are transmitted at the same time, the required reliability levels for the scheduling request and the uplink data may be different from one another. Therefore, the scheduling request and the uplink data may be differentiated from one another by configuring different power levels that are used when transmitting the scheduling request and the uplink data.

Additionally, the UE may receive a first Modulation and Coding Scheme (MCS) that is used for the transmission of the uplink data and a second MCS that is used for the transmission of the scheduling request. If the first indicator indicates the activation of the SPS resource, and if the second indicator indicates the deactivation of the SR resource, the uplink data may be transmitted by using the first MCS. If the first indicator indicates the activation of the SPS resource, and if the second indicator indicates the activation of the SR resource, the uplink data and the scheduling request may be transmitted by using the second MCS. By having the base station transmit the modulation and coding scheme information by dividing the corresponding information to a first MCS and a second MCS, the UE may transmit the information that is related to the scheduling request in more detail. Additionally, the scheduling request may be transmitted through a Medium Access Control (MAC) header at the same time as the buffer status report (BSR). More specifically, by having the UE transmit the scheduling request and the buffer status report (BSR) to the base station at the same time from the MAC layer through the MAC header, a larger amount (or size) of information may be transmitted through the physical layer as compared to when transmitting the scheduling request.

Moreover, if the first indicator indicates the activation of the SPS resource, and if the second indicator indicates the deactivation of the SR resource, the uplink data may be transmitted to the base station through the SR resource. In this case, the UE may use the SR resource as resource for transmitting uplink data.

Furthermore, the SR resource may be assigned to a resource being adjacent to the uplink reference signal. Since the signaling request corresponds to a signal requiring a high reliability level, it is preferable to position the scheduling request to be near (or approximate to) the reference signal so that the channel can be accurately estimated.

Figure 14:
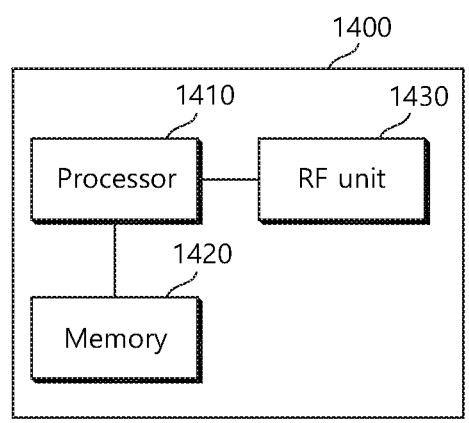
FIG. 14 is a block diagram showing an apparatus for wireless communication for implementing an embodiment of the present invention.

FIG. 14 is a block diagram showing an apparatus for wireless communication for implementing an embodiment of the present invention.

An apparatus (1400) for wireless communication includes a processor (1410), a memory (1420), and a radio frequency (RF) unit (1430).

The processor (1410) may be configured to implement proposed functions, procedures and/or methods described in this description. Layers of the radio interface protocol may be implemented in the processor (1410). The processor (1410) may handle a procedure explained above. The memory (1420) is operatively coupled with the processor (1410), and the RF unit (1430) is operatively coupled with the processor (1410).

The processor (1410) may include application-specific integrated circuit (ASIC), other chipset, logic circuit and/or data processing device. The memory (1420) may include read-only memory (ROM), random access memory (RAM), flash memory, memory card, storage medium and/or other storage device. The RF unit (1430) may include baseband circuitry to process radio frequency signals. When the embodiments are implemented in software, the techniques described herein can be implemented with modules (e.g., procedures, functions, and so on) that perform the functions described herein. The modules can be stored in memory (1420) and executed by processor (1410). The memory (1420) can be implemented within the processor (1410) or external to the processor (1410) in which case those can be communicatively coupled to the processor (1410) via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting a scheduling request by a user equipment (UE) in a wireless communication system, comprising:
   receiving resource allocation information for a semi-persistent scheduling (SPS) resource and a scheduling request (SR) resource from a base station;
   receiving a first indicator indicating activation or deactivation of the semi-persistent scheduling resource and a second indicator indicating activation or deactivation of the scheduling request resource from the base station;
   determining whether to transmit the scheduling request based on the first indicator and the second indicator;

transmitting the scheduling request to the base station through the scheduling request resource based on the resource allocation information;

performing rate matching for uplink data; and transmitting uplink data having the rate matching performed therein to the base station, wherein, if the first indicator indicates activation of the semi-persistent scheduling resource, and if the second indicator indicates deactivation of the scheduling request resource, the data is processed with rate matching based on a size of part of the semi-persistent scheduling resource, and wherein the scheduling request resource is included in the semi-persistent scheduling resource.

2. The method of claim 1, wherein, if the first indicator indicates activation of the semi-persistent scheduling resource, and if the second indicator indicates activation of the scheduling request resource, the data is processed with rate matching based on a size of part of the semi-persistent scheduling resource.

3. The method of claim 2, further comprising:

receiving scheduling information from the base station as a response to the scheduling request without transmitting a buffer status report (BSR), wherein the scheduling information is determined based on a scheduling priority and a size of uplink data.

4. The method of claim 2, further comprising:

receiving first power control information for transmission of the uplink data and second power control information for transmission of the scheduling request from the base station.

5. The method of claim 2, further comprising:

receiving a first Modulation and Coding Scheme (MCS) being used for transmission of the uplink data and a second MCS being used for transmission of the scheduling request, wherein, if the first indicator indicates activation of the semi-persistent scheduling resource, and if the second indicator indicates deactivation of the scheduling request resource, the uplink data are transmitted by using the first MCS, and wherein, if the first indicator indicates activation of the semi-persistent scheduling resource, and if the second indicator indicates activation of the scheduling request resource, the uplink data and the scheduling request are transmitted by using the second MCS, and wherein the scheduling request is transmitted through a Medium Access Control (MAC) header simultaneously as the buffer status report (BSR).

6. The method of claim 2, wherein, if the first indicator indicates activation of the semi-persistent scheduling resource, and if the second indicator indicates deactivation of the scheduling request resource, the uplink data are transmitted to the base station through the scheduling request resource.

7. The method of claim 1, wherein the scheduling request resource is assigned to a resource being adjacent to an uplink reference signal.

8. A user equipment (UE) for transmitting a scheduling request in a wireless communication system, the UE comprising:

a transceiver transmitting and receiving radio signals; and a processor being operatively connected to the transceiver, wherein the processor:

receives resource allocation information for a semi-persistent scheduling (SPS) resource and a scheduling request (SR) resource from a base station, receives a first indicator indicating activation or deactivation of the semi-persistent scheduling resource and a second indicator indicating activation or deactivation of the scheduling request resource from the base station, determines whether to transmit the scheduling request based on the first indicator and the second indicator, transmits the scheduling request to the base station through the scheduling request resource based on the resource allocation information, performs rate matching for uplink data, and transmits uplink data having the rate matching performed therein to the base station, wherein, if the first indicator indicates activation of the semi-persistent scheduling resource, and if the second indicator indicates deactivation of the scheduling request resource, the data is processed with rate matching based on a size of part of the semi-persistent scheduling resource, and wherein the scheduling request resource is included in the semi-persistent scheduling resource.

9. The UE of claim 8, wherein, if the first indicator indicates activation of the semi-persistent scheduling resource, and if the second indicator indicates activation of the scheduling request resource, the data is processed with rate matching based on a size of part of the semi-persistent scheduling resource.

10. The UE of claim 9, wherein the processor receives scheduling information from the base station as a response to the scheduling request without transmitting a buffer status report (BSR), and wherein the scheduling information is determined based on a scheduling priority and a size of uplink data.

11. The UE of claim 9, wherein the processor receives first power control information for transmission of the uplink data and second power control information for transmission of the scheduling request from the base station.

12. The UE of claim 9, wherein the processor receives a first Modulation and Coding Scheme (MCS) being used for transmission of the uplink data and a second MCS being used for transmission of the scheduling request, wherein, if the first indicator indicates activation of the semi-persistent scheduling resource, and if the second indicator indicates deactivation of the scheduling request resource, the uplink data are transmitted by using the first MCS, and wherein, if the first indicator indicates activation of the semi-persistent scheduling resource, and if the second indicator indicates activation of the scheduling request resource, the uplink data and the scheduling request are transmitted by using the second MCS, and wherein the scheduling request is transmitted through a Medium Access Control (MAC) header simultaneously as the buffer status report (BSR).

13. The UE of claim 9, wherein, if the first indicator indicates activation of the semi-persistent scheduling resource, and if the second indicator indicates deactivation of the scheduling request resource, the uplink data are transmitted to the base station through the scheduling request resource.

14. The UE of claim 8, wherein the scheduling request resource is assigned to a resource being adjacent to an uplink reference signal.

\* \* \* \* \*